(12) United States Patent
Nguyen et al.

(10) Patent No.: US 10,620,857 B2
(45) Date of Patent: Apr. 14, 2020

(54) COMBINED BACKUP POWER

(71) Applicant: HEWLETT PACKARD ENTERPRISE DEVELOPMENT LP, Houston, TX (US)

(72) Inventors: Hai Ngoc Nguyen, Spring, TX (US); Han Wang, Sugar Land, TX (US); Patrick A. Raymond, Houston, TX (US); Raghavan V. Venugopal, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 88 days.

(21) Appl. No.: 15/327,438

(22) PCT Filed: Oct. 31, 2014

(86) PCT No.: PCT/US2014/063416
§ 371 (c)(1),
(2) Date: Jan. 19, 2017

(87) PCT Pub. No.: WO2016/068994
PCT Pub. Date: May 6, 2016

(65) Prior Publication Data
US 2017/0168744 A1    Jun. 15, 2017

(51) Int. Cl.
*G06F 3/06*    (2006.01)
*H02J 9/06*    (2006.01)
(Continued)

(52) U.S. Cl.
CPC ............ *G06F 3/0625* (2013.01); *G06F 1/263* (2013.01); *G06F 1/266* (2013.01); *G06F 1/305* (2013.01);
(Continued)

(58) Field of Classification Search
CPC ...... G06F 3/065; G06F 3/0679; G06F 3/0685; G06F 3/0619; G06F 3/0625
(Continued)

(56) References Cited

U.S. PATENT DOCUMENTS 5,633,539 A * 5/1997 Tassitino, Jr. ............. H02J 9/06
307/52
6,311,279 B1 * 10/2001 Nguyen .................. G06F 1/263
307/66
(Continued)

FOREIGN PATENT DOCUMENTS

CN      101854077      10/2010
EP      1006641 A3 *   6/2000     ............... H02J 3/46
(Continued)

OTHER PUBLICATIONS

PCT/ISA/KR, International Search Report, dated Jun. 10, 2015, PCT/US2014/063416, 12 pps.
(Continued)

*Primary Examiner* — Pierre Miche Bataille
(74) *Attorney, Agent, or Firm* — Brooks, Cameron & Huebsch, PLLC (57) ABSTRACT

Example implementations relate to combined backup power. For example, a system for combined backup power can include a combined backup power supply (CBPS) coupled to a node and a plurality of loads supported by the node. The CBPS can include an uninterruptible power supply (UPS) and a backup power supply coupled to the UPS to act as redundancy for the UPS.

16 Claims, 6 Drawing Sheets

(51) Int. Cl.
  *G06F 1/26* (2006.01)
  *G06F 1/30* (2006.01)
  *G06F 1/3234* (2019.01)
  *G06F 1/3287* (2019.01)
(52) U.S. Cl.
  CPC .......... *G06F 1/3275* (2013.01); *G06F 1/3287* (2013.01); *G06F 3/065* (2013.01); *G06F 3/0619* (2013.01); *G06F 3/0679* (2013.01); *G06F 3/0685* (2013.01); *H02J 9/06* (2013.01)
(58) Field of Classification Search
  USPC .................................................. 711/103, 112
  See application file for complete search history.

(56)  References Cited

U.S. PATENT DOCUMENTS

| | | | |
|---|---|---|---|
| 7,514,815 | B2 | 4/2009 | Paik |
| 8,446,040 | B2* | 5/2013 | Paik .................. H02J 3/14 307/39 |
| 9,075,592 | B2* | 7/2015 | Yoshida .................. G06F 1/30 |
| 9,692,231 | B2* | 6/2017 | Nguyen .................. H02J 3/006 |
| 10,432,017 | B1* | 10/2019 | Morales ................ H02J 7/0068 |
| 2002/0122322 | A1* | 9/2002 | Oughon, Jr. ............ H02J 9/061 363/37 |
| 2006/0041767 | A1* | 2/2006 | Maxwell ............... G06F 1/3209 713/323 |
| 2007/0228832 | A1 | 10/2007 | Pratt et al. |
| 2008/0231118 | A1 | 9/2008 | Roepke |
| 2009/0230772 | A1* | 9/2009 | Caudill ..................... H02J 3/46 307/44 |
| 2009/0235038 | A1 | 9/2009 | Sartore |
| 2010/0164290 | A1 | 7/2010 | Chiang |
| 2012/0098342 | A1 | 4/2012 | Johnson |
| 2013/0099574 | A1* | 4/2013 | Bourgeois ............... H02J 9/062 307/66 |
| 2013/0318371 | A1 | 11/2013 | Hormuth |
| 2014/0133257 | A1 | 5/2014 | Ahn |
| 2014/0379160 | A1* | 12/2014 | Fallon .................... G06Q 50/06 700/297 |
| 2015/0061384 | A1* | 3/2015 | Towner .................... H02J 1/10 307/23 |
| 2015/0074431 | A1* | 3/2015 | Nguyen .................. H02J 3/006 713/300 |
| 2015/0180276 | A1* | 6/2015 | Kanarellis ................. H02J 9/00 307/66 |
| 2016/0349817 | A1* | 12/2016 | Kumar ..................... G06F 1/30 |
| 2017/0060706 | A1* | 3/2017 | Kinoshita ........... G06F 11/1666 |

FOREIGN PATENT DOCUMENTS

| | | |
|---|---|---|
| TW | 201312899 | 3/2013 |
| WO | WO-2010093356 | 8/2010 |
| WO | WO-2014105008 | 7/2014 |

OTHER PUBLICATIONS

Song Liu, "Flikker: Saving DRAM Refresh-power through Critical Data Partitioning," Mar. 5-11, 2011, < http://research.microsoft.com/pubs/147610/asplos_2011.pdf.

* cited by examiner

COMBINED BACKUP POWER

BACKGROUND

As reliance on computing systems continues to grow, so too does the demand for reliable power systems and back up schemes for these computing systems. Servers, for example, may provide architectures for backing up data to flash or persistent memory as well as backup power sources for powering this back up of data after the loss of power. Backup power supplies may sometimes include energy components such as capacitors or batteries.

DETAILED DESCRIPTION

A computing data storage system can include a number of nodes that support a number of loads. The nodes can be a number of servers, for example. A number of loads can include storage controllers or devices associated with the servers. For example, a load can include cache memory, dual inline memory modules (DIMMs), Non-Volatile Dual In-Line Memory Modules (NVDIMMs), and/or array control logic, among other storage controllers and/or devices associated with the servers. A computing data storage system can include a backup power system operatively coupled to the number of nodes to support the number of loads in an event of a removal of a primary power supply. The power system can include a detection module that detects that an uninterruptible power supply (UPS) operatively coupled to a backup power supply (BPS) is not sufficiently backing up a power system (e.g., the UPS has been "drained") within a backup power and load discovery system, and a backup power control module that, in response to the insufficient backup by the UPS, determines a number of loads that are to be protected with backup power from the BPS, and configures the BPS to provide backup power to the loads. In other words, the BPS can act as redundancy for the UPS. In a similar manner, in some examples, the UPS can act as redundancy for the BPS. As used herein, to be protected by the BPS can refer to the BPS providing battery backup power in order for data to be moved from cache memory to non-volatile memory.

A removal of a primary power supply can be scheduled or un-scheduled. For instance, a scheduled removal of the primary power supply can be the result of scheduled maintenance on the number of nodes and/or the number of loads. A scheduled removal of the primary power supply can be an intentional power down of the number of nodes and/or the number of loads to add and/or remove nodes to a chassis and/or network connected to a primary power supply. In another example, a scheduled removal of the primary power supply can be an intentional power down to add and/or remove one or more loads to or from one or more nodes.

An un-scheduled primary power supply removal can be a failure in the primary power supply. An un-scheduled primary power supply removal can occur when, for example, the primary power supply fails momentarily and/or for an extended period of time.

It may be desirable to move data from cache memory in the number of nodes to non-volatile memory upon the removal of a primary power supply. However, moving data from cache memory to non-volatile memory can involve a power supply. A BPS can be a secondary power supply that is used to provide power for moving data from cache memory to non-volatile memory when the primary power is removed (e.g., backup mode). Further, the BPS can be a shared BPS, in that the shared BPS associated with a particular node is shared among a plurality of loads associated with that node.

A UPS can be a secondary power supply that is used to provide emergency power to a load when an input power source (e.g., main power) fails. A UPS can provide near-instantaneous protection from power interruptions by supplying energy stored in batteries, supercapacitors, or flywheels, among others.

A UPS and/or a BPS can act as redundancy. For instance, a UPS and/or a BPS can act as a duplicate of a critical component or function of a power system (e.g., in the form of a backup or fail-safe). This can increase reliability of the system. A UPS can act as redundancy via a self-refresh mode, while a BPS can act as redundancy via a backup mode (also referred to as "normal" backup mode).

Power modes, as discussed herein, (e.g., backup mode and/or self-refresh mode) can define how a component/device consumes primary power and/or backup power. A self-refresh mode can include a low power mode in which memory (e.g., dynamic random-access memory (DRAM)) maintains refreshes internally when primary power is removed. A self-refresh mode can provide the ability to suspend operation of a controller to save power without losing data stored in memory. In a self-refresh mode, data cannot be retrieved from memory and data cannot be saved into memory. Placing memory in a self-refresh mode may save power by reducing a refresh rate associated with memory. In a number of examples, placing memory in self-refresh mode can save a greater amount of energy than placing memory in a backup power mode or a mode associated with normal operation of memory.

As previously noted, a backup mode can include moving data from cache memory to non-volatile memory when the primary power is removed. The back-up power mode can allow a transfer of data from volatile memory. The back-up power mode can consume more energy than the self-refresh mode because the back-up power mode may receive instructions from an activated controller and because the back-up power mode can support data transfers from volatile memory. However, volatile memory in a back-up power mode can use less energy than a normal operation of the volatile memory.

Examples of the present disclosure can include a system comprising a NVDIMM and a dual in-line memory module (DIMM), among other loads, A NVDIMM is a DRAM DIMM that retains data even when electrical power is removed.

In some power system approaches, an NVDIMM may be placed in a system to protect business critical data from loss during a power outage, for example. However, due to the costly nature of NVDIMMs, a conventional DIMM may also be placed in the system. This DIMM will lose data when power to the system is lost.

In contrast, examples of the present disclosure can handle both conventional DIMMs and NVDIMMs to keep data during a system power outage (e.g., or other outage). Examples of the present disclosure can reduce costs associated with NVDIMMS and DIMMS and can strengthen backup power flexibility and robustness to accommodate various consumer power environments.

Examples of the present disclosure can include a system that includes a UPS portion and a BPS portion to coordinate power combinations between DIMMs and NVDIMMs. In addition, examples of the present disclosure can provide DIMM as a non-volatile device without transferring data to a non-volatile device during early stages of a power outage. Examples of the present disclosure can also maintain data in DIMMs to keep data refreshed at later stages of a power outage. For instance, in cases wherein insufficient power is forecasted, maintaining the data in DIMMs can keep data refreshed before power returns.

Figure 1:
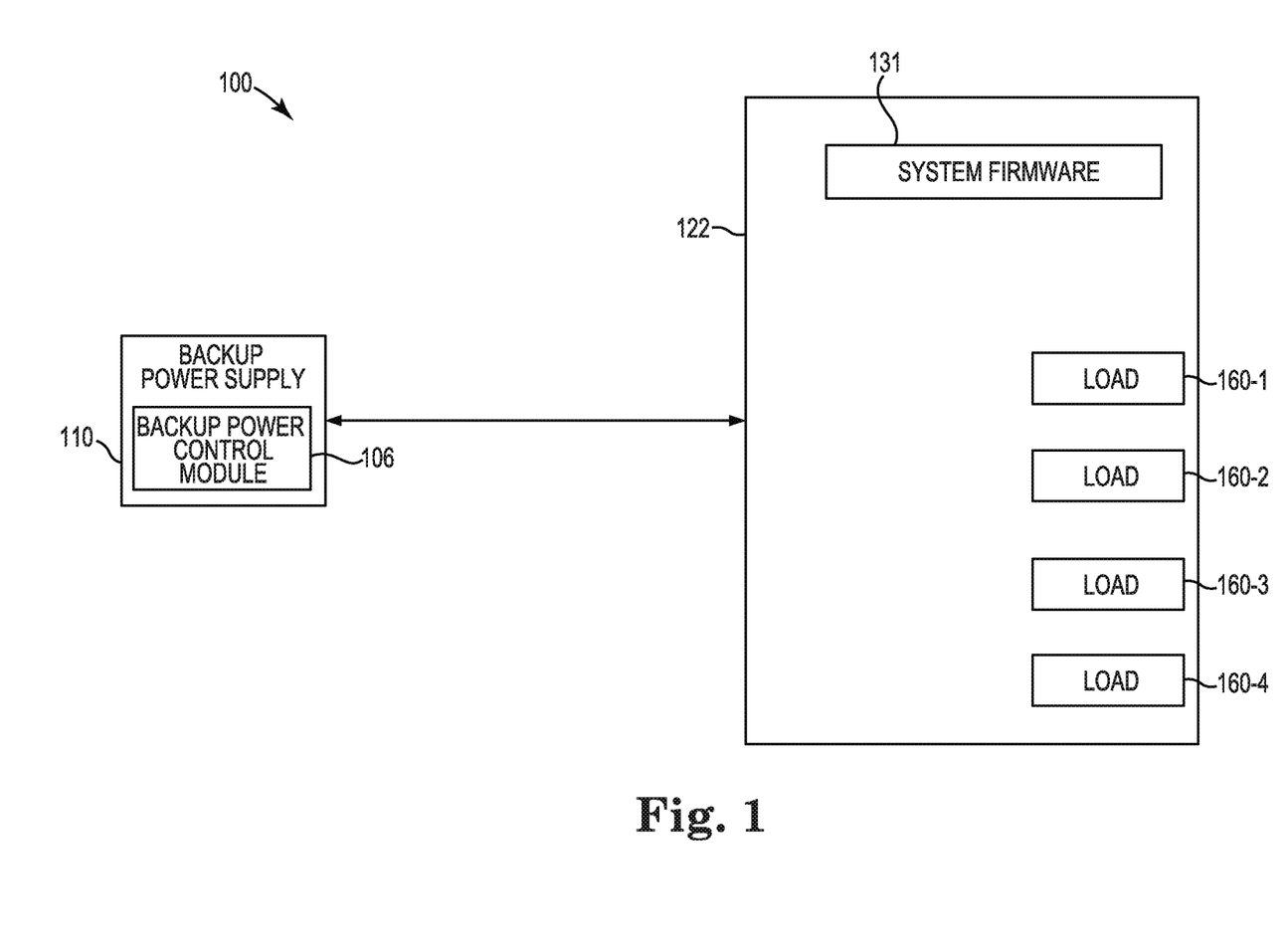
FIG. 1 illustrates a block diagram of an example of a system or combined backup power, according to the present disclosure.

FIG. 1 illustrates a block diagram of an example of a system 100 for combined backup power according to the present disclosure. As illustrated in FIG. 1, the system 100 can include a BPS 110, a backup power control module 106, and a node 122 coupled to the BPS. The BPS can be controlled by the backup power control module 106, as discussed further in relation to FIGS. 2-6. Furthermore, the node 122 can support a plurality of loads (e.g., load 160-1, load 160-2, load 160-3, and load 160-4, collectively referred to herein as loads 160), For instance, the node 122 can support a number of storage controllers and/or a number of storage devices such as NVDIMMs.

The node 122 can include system firmware 131 that enables communication between the BPS 110 and the plurality of loads 160-1, 160-2, 160-3, 160-4. System firmware can be computer executable instructions stored on the node 122. Examples of system firmware can include Basic Input/Output System (BIOS) and a Baseboard Management Controller (BMC) unit, BIOS can provide initialization and testing of the hardware components of the node 122 and loads an operating system for the node when it is powered on. A BMC unit can be a specialized microcontroller embedded on the motherboard of the node 122 that manages the interface between system management software and platform hardware. While examples herein use BIOS and a BMC unit as examples of system firmware, examples of the present disclosure are not so limited. Other types of system firmware can be used to perform the various examples described in this disclosure. Furthermore, while specific examples are outlined herein, describing actions performed by BIOS and by a BMC unit, examples are not limited. Actions described as being performed by BIOS can be performed by a BMC unit and/or other types of system firmware. Similarly, actions described as being performed by a BMC unit can be performed by BIOS and/or other types of system firmware.

The system firmware 131 can send a self-refresh mode command to the plurality of loads in response to a system power outage. For example, BIOS can determine a subset of the plurality of loads 160 that are to be protected by the UPS (not illustrated), for instance via a self-refresh mode. In such an example, BIOS can also determine a subset of the plurality of loads 160 that are to be protected by the BPS 110, for instance, via a backup mode. BIOS can communicate, via a BMC unit, for example, identification of the subset to the UPS and/or the BPS 110. For instance, the BIOS can determine that loads 160-1 and 160-2 are to receive backup power from the UPS and send a self-refresh mode command. Additionally or alternatively, the BIOS can determine that loads 160-3 and 160-4 are to receive backup power form BPS 110 in the event of a removal of the primary power supply and/or insufficient redundancy by the UPS, and can communicate identification of loads 160-3 and 160-4 to the BPS 110. Examples are not so limited, however, and more than one subset of the plurality of loads 160 can be identified.

The system firmware can perform a number of other functions related to combined backup power. For instance, BIOS can determine a current charge level of the BPS 110 and/or a UPS. Based on the current charge level of the BPS 110 and/or the UPS, BIOS can determine how to share charges between BPS 110 and the UPS. For instance, it may be desired to ensure BPS 110 has sufficient charge for backup, meaning the UPS charges can be shared to BPS in an instance where BPS 110 is not sufficient to support a top priority load group (e.g., within loads 160). In such an example, a self-refresh duration can be reduced, but not for backup time. The system firmware can also comprising notify loads 160 of a switch from self-refresh mode via UPS to backup mode via BPS and vice versa.

Furthermore, the system firmware can communicate between the node 122 and the BPS 110 and/or node 122 and a UPS, identification of the subset of the plurality of loads 160 that are to be protected by the BPS 110 and/or the UPS. For example, a BMC unit can communicate the subset of the plurality of loads (e.g., loads 160-3 and 160-4 in the example presented above) between node 122 and the backup power control module 106. Similarly, a BMC unit can communicate the subset of the plurality of loads (e.g., loads 160-1 and 160-2 in the example presented above) between node 122 and a UPS control module (not shown).

Figure 2:
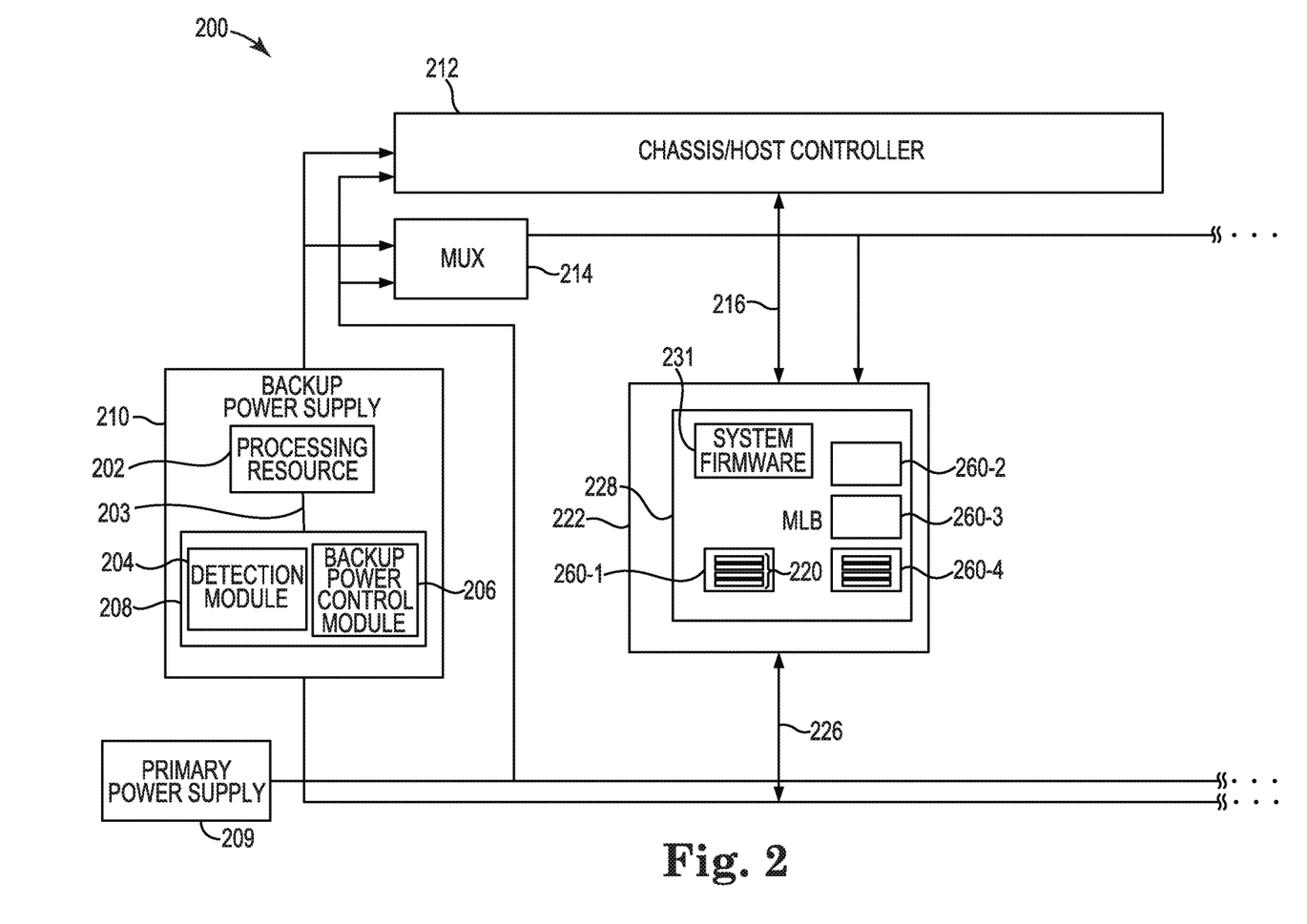
FIG. 2 illustrates a block diagram of an example of a system for combined backup power, according to the present disclosure.

FIG. 2 illustrates a detailed block diagram of an example of a system 200 for combined backup power according to the present disclosure. FIG. 2 includes the BPS 210, a multiplexer (MUX) 214, a chassis/host controller 212, and the node 222.

As illustrated in FIG. 2, the node 222 can host a number of loads (e.g., loads 260-1, 260-2, 260-3, 260-4, collectively referred to herein as loads 260). For instance, the node 222 can include a number of devices, such as local memory or data storage (e.g., referred generally as memory). The memory may contain volatile and non-volatile memory (e.g., cache and NVDIMM). Thus, each memory in the node 222 can contain a number of NVDIMM slots 220. Each NVDIMM slot among the number of NVDIMM slots 220 can provide a load to the system 200. Node 222 can include other devices such as cache memory, DIMMs, array control logic, and storage controllers, among other devices associated with the node 222, and each of the devices associated with the node 222 can provide a load to the system 200. For instance, load 260-2 can be provided by a storage controller, whereas each NVDIMM slot among the number of NVDIMM slots 220 can provide load 260-1. In some examples, the node 222 can also include a control logic unit (not illustrated in FIG. 2).

The BPS 210 can include a processing resource 202 connected via a connection 203 to a memory resource 208, e.g., a computer-readable medium (CRM), machine readable medium (MRM), database, etc. In some examples, memory resource 208 may be a non-transitory storage medium and/or a non-transitory MRM, where the term "non-transitory" does not encompass transitory propagating signals.

The memory resource 208 can include a number of computing modules. The example of FIG. 2 shows detection module 204 and backup power control module 206. As used herein, a computing module can include program code (e.g., computer executable instructions), hardware, firmware, and/or logic, but a computing module at least includes instructions executable by the processing resource 202 (e.g., in the form of modules) to perform particular actions, tasks, and functions described in more detail herein in reference to FIGS. 4, 5, and 6. Instructions associated with a particular module, e.g., modules 204 and 206, when executed by the processing resource 202 can also be referred to and function collectively as a component and/or computing engine. As used herein, an engine can include hardware firmware, logic, and/or executable instructions. But an engine at least includes hardware (e.g., logic in the form of an application specific integrated circuit (ASIC)) to perform particular actions, tasks and functions described in more detail herein in reference to FIGS. 4, 5, and 6.

Engines and/or the number of modules (e.g., 204 and 206 shown in FIG. 2) can be sub-engines/modules of other engines/modules and/or combined to perform particular actions, tasks, and functions within a particular system and/or computing device. Engines and/or modules described herein can be located in a single system and/or computing device or reside in separate distinct locations in a distributed computing environment (e.g., cloud computing environment).

Figure 4:
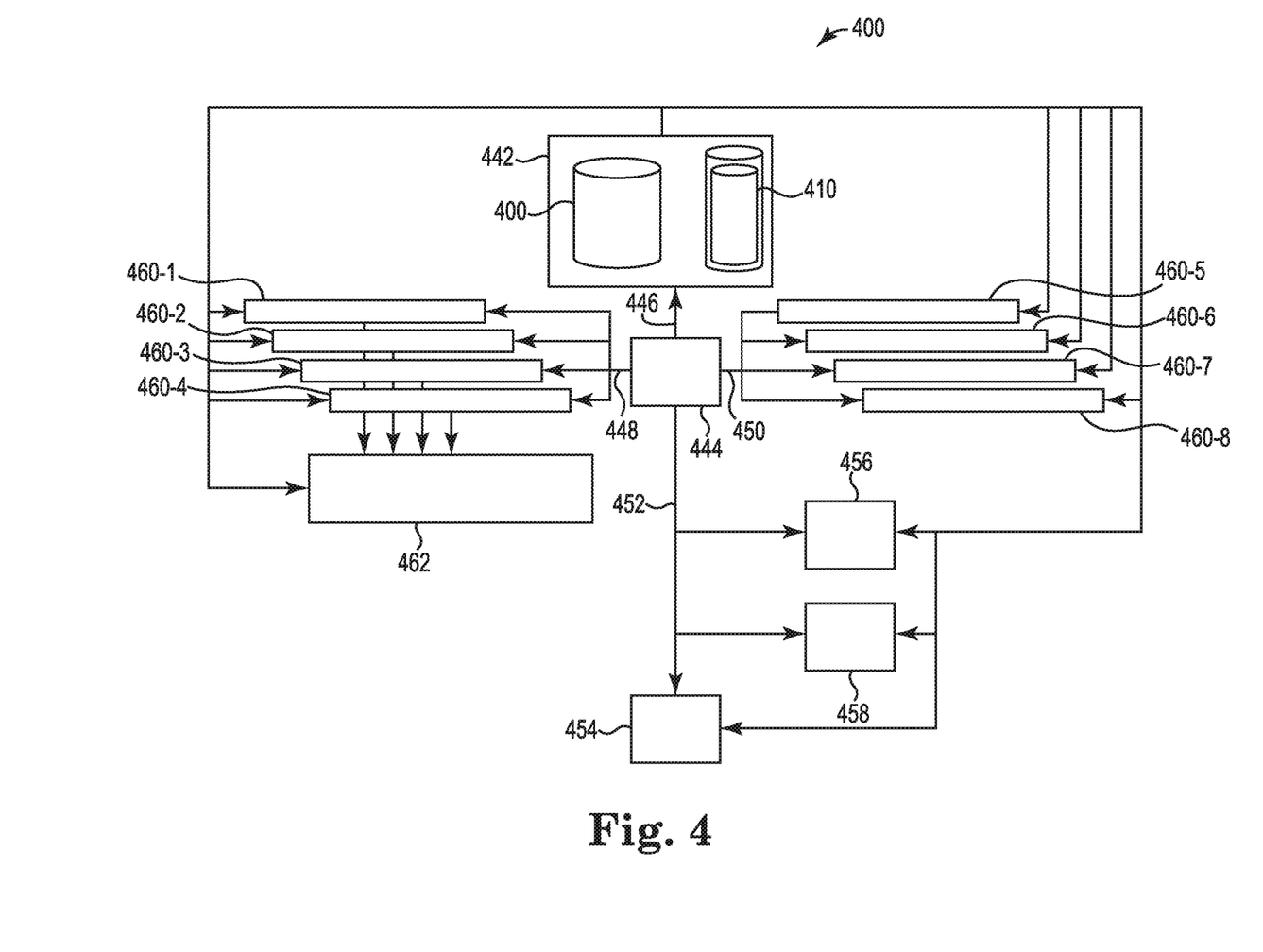
FIG. 4 illustrates a block diagram of an example of a system for combined backup power, according to the present disclosure.
Figure 5:
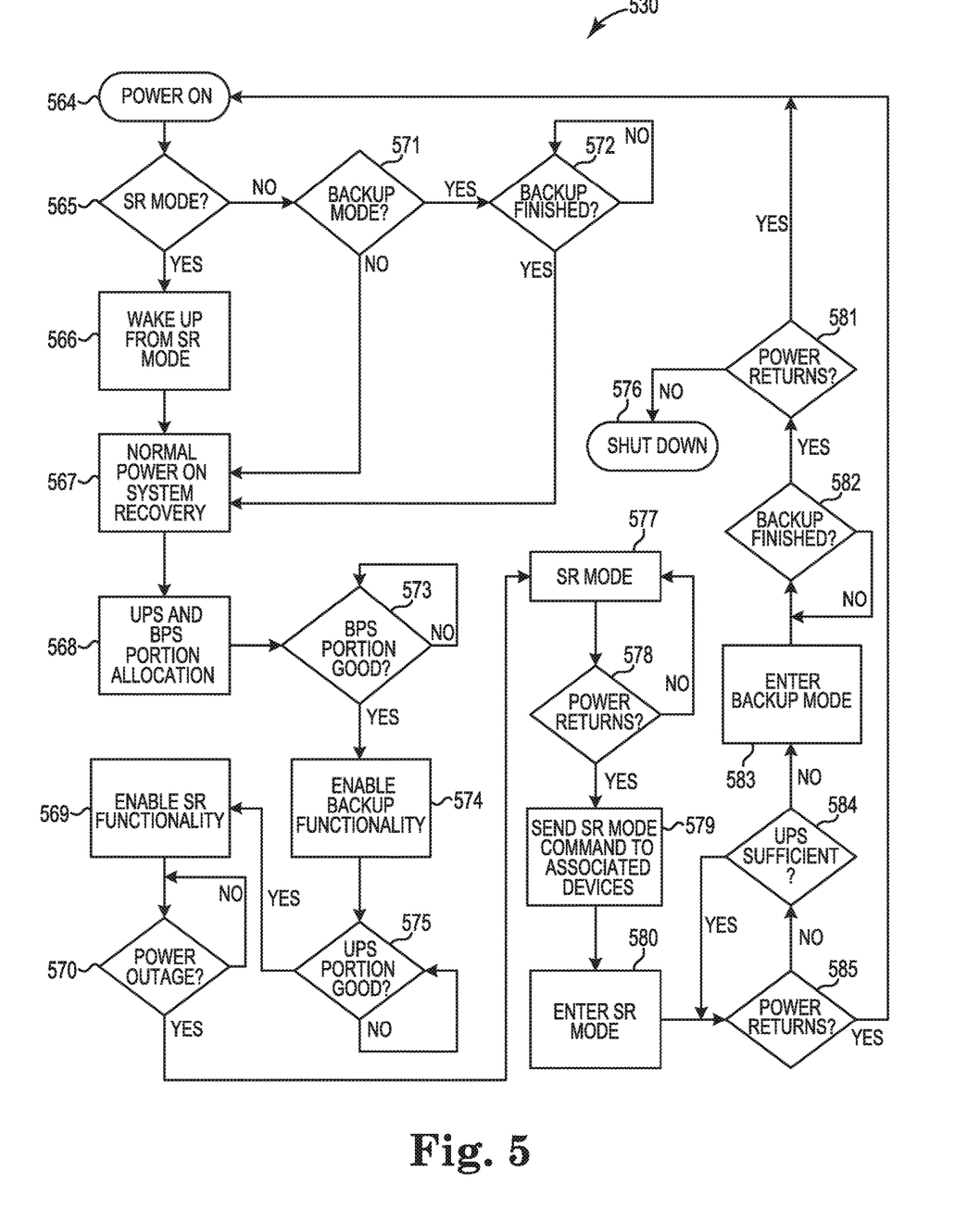
FIG. 5 illustrates an example system flow diagram according to the present disclosure.
Figure 6:
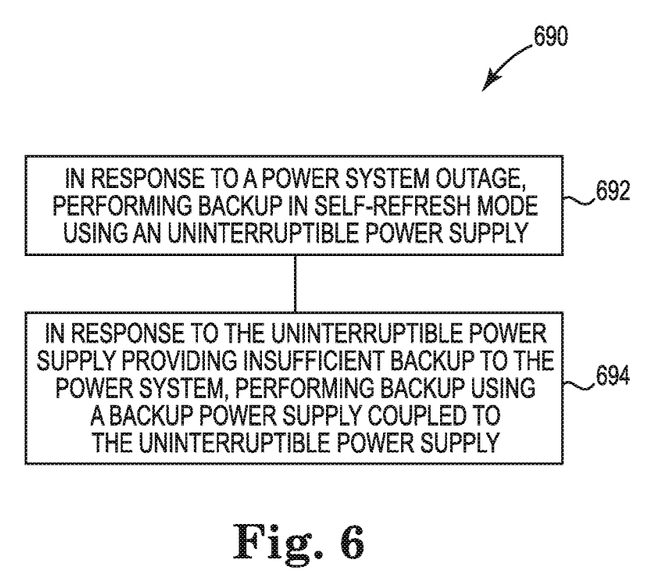
FIG. 6 illustrates a diagram of an example method according to the present disclosure.

The system 200 can perform a number of functions and operations as described in FIGS. 4, 5, and 6, and can include the apparatus and methods for combined backup power as described herein.

The BPS 210 can be a battery that is external to the node 222 and external to the chassis/host controller 212 supporting the node 222. The BPS 210 can provide power to the node 222. The BPS 210 can support different chassis/host controllers (not shown) and different MUXs (not shown) to support a plurality of nodes on different chassis. In some examples, system 200 can include a UPS (not illustrated in FIG. 2) operatively coupled to the BPS 210, as will be discussed further herein with respect to FIGS. 4, 5, and 6.

The node 222 can include a main logic board (MLB) 228, and the MLB 228 can include system firmware 231. The system firmware 231 can include a number of components, such as BIOS and/or a BMC unit. The MLB 228 components can allow the node 222 to communicate with the BPS 210 and the chassis/host controller 212.

Signal and control lines can connect the BPS 210 to the chassis/host controller 212 and to the MUX 214. The MUX 214 and the chassis/host controller 212 can be coupled to the node 222 via a line 216. The line 216 can include a signal line and can provide for the install, registering, data, and clocking of the node 222 with the chassis/host controller 212.

In some examples, the control logic (not illustrated in FIG. 2) can be coupled to the node via lines 226 (e.g., control signal and power lines). For example, the node 222 can provide a signal to the lines 226 and 216 when data is to be backed up to non-volatile memory. The lines 216 and 226 also couple the chassis/host controller 212 to the node 222 and the control logic.

The system firmware 231 can allow the node 222 to communicate with the BPS 210 and or a UPS. For instance, the system firmware 231 can include a BMC unit. As described herein, a BMC unit can be a specialized microcontroller embedded on the motherboard of the node 222, and that manages the interface between system management software and platform hardware. For example, different types of sensors built into the system 200 can report to the BMC unit on parameters such as temperature, cooling fan speeds, power status, and operating system status, among other parameters.

The backup power control module 206 can have instructions stored in a non-transitory storage medium (e.g., memory resource 108) to communicate between the system firmware 231 and the plurality of loads to calculate real-time load consumption and determine how many loads among the plurality of loads 260 are to be protected with backup power and/or how many loads among the plurality of loads 260 are to be protected with the UPS (e.g., via self-refresh mode).

Further, the detection module 204 can have instructions stored in a non-transitory storage medium (e.g., memory resource 208) to use the system firmware 231 (such as a BMC unit) to detect that a UPS operatively coupled to a BPS is not sufficiently backing up a power system (e.g., the UPS has been "drained") within a backup power and load discovery system and communicate this information to the plurality of loads 260 and/or a subset of the plurality of loads 260. In response, a BPS can be act as redundancy, in some instances.

Figure 3:
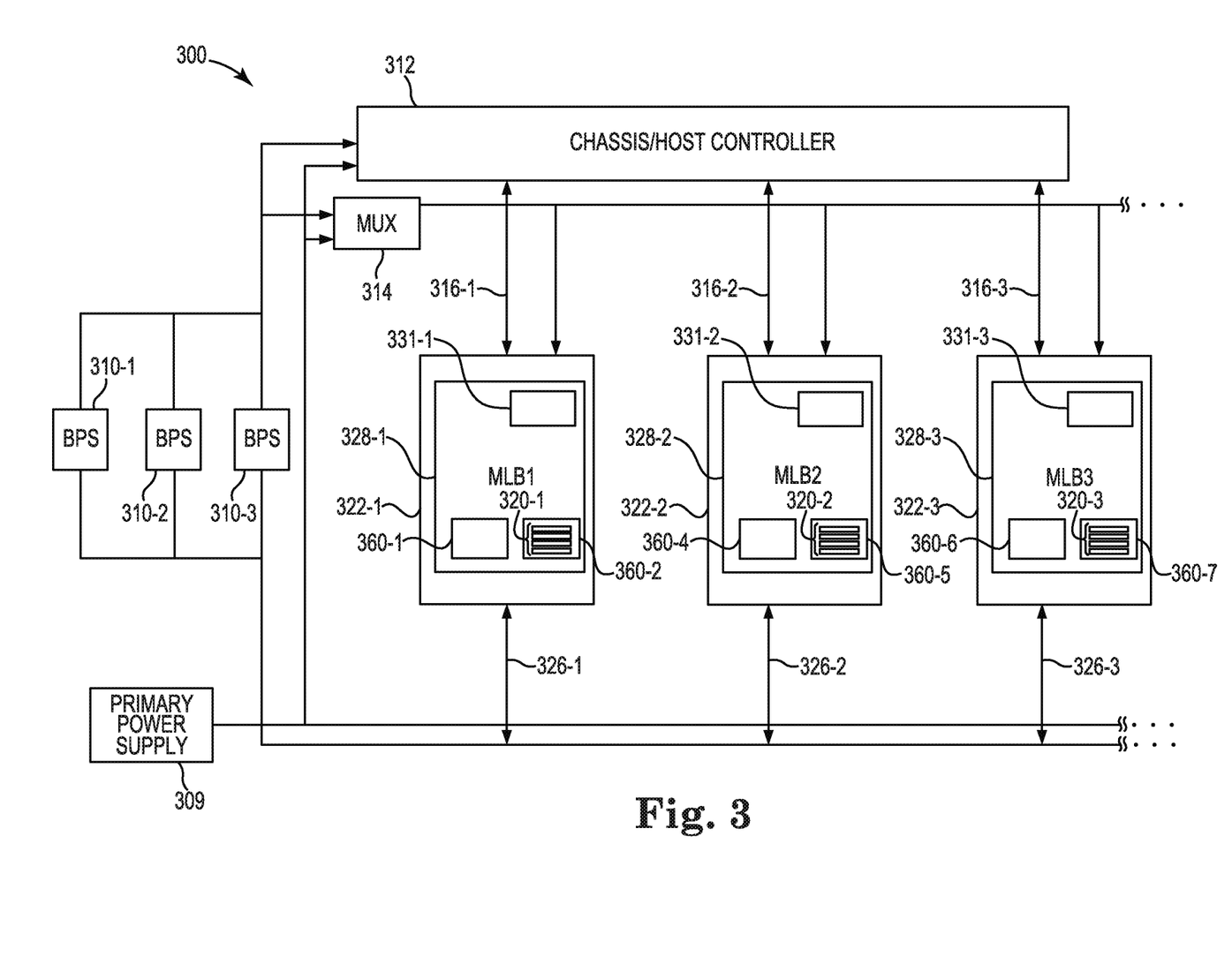
FIG. 3 illustrates a block diagram of an example of a system for combined backup power, according to the present disclosure.

FIG. 3 illustrates a detailed block diagram of an example of a system 300 for combined backup power according to the present disclosure. Although illustrated in simplified form in FIG. 3, it is to be understood that BPS 310-1, 310-2, and 310-3 include the components of the BPS 210 illustrated in FIG. 2.

As illustrated in FIG. 3, the system 300 can include a plurality of nodes, where each node has a separate BPS. For example, the system 300 can include a plurality of nodes 322-1, 322-2, 322-3 (herein referred to as nodes 222), and each of the nodes 222 can have an associated BPS. That is, node 322-1 can be associated with BPS 1 (e.g., 310-1), node 322-2 can be associated with BPS 2 (e.g., 310-2), and node 322-3 can be associated with BPS 3 (e.g., 310-3).

Also, as described in relation to FIGS. 1 and 2, each of the nodes 222 can have a plurality of components. For instance, each of the nodes 222 can have an MLB (e.g., 328-1, 328-2, and 328-3) and each of the plurality of MLBs can include system firmware (e.g., 331-1, 331-2, 331-3). Each system firmware on a node can have BIOS and a BMC unit among other system firmware components. While FIG. 3 shows three (3) nodes 322-1, 322-2, and 322-3, the system 300 can have fewer or more nodes than illustrated. Similarly, each of the plurality of nodes 322 can include a plurality of loads (e.g., loads 360-1, . . . , 360-7, hereinafter referred to as loads 360). For example, the nodes 322 may host six (6) or more loads (e.g., two loads per node). In some examples, more or fewer loads can be hosted in a node, and each of the nodes 322 can host a different number of loads. For instance, node 322-1 can host four (4) loads (e.g., two storage controllers and two storage devices) while node 322-2 can host six (6) loads (e.g., three storage controllers and three storage devices).

In this manner, each of the plurality of nodes 322 can include a plurality of loads, and the plurality of loads within a node can have a BPS. In other words, the BPS associated with a particular node is shared among the plurality of loads associated with that node. As discussed in relation to FIGS. 1-3, a node (e.g., node 222 illustrated in FIG. 2, and the plurality of nodes 322 illustrated in FIG. 3) can host a number of loads.

In some examples, system 300 can include a UPS (not shown) operatively coupled to each BPS 310. The UPS can act as redundancy for the BPS, and the BPS can act as redundancy for the UPS, as will be discussed further herein with respect to FIGS. 4-6.

FIG. 4 illustrates a block diagram of an example of a system for combined backup power, according to the present disclosure. System 400 can include a combined back up power supply (CBPS) 442 (e.g., coupled to a node). CBPS 442 can include power energy allocations BPS 410 and UPS 440 operatively coupled to one another and providing redundancy to one another. For example, UPS 440 can be used to back up data via a self-refresh mode (e.g., low power consumption, ultimate low power consumption, etc.), and/or BPS 410 can be used to back up data via a backup mode.

System 400 can also include loads 460-1, . . . , 460-8 (herein after referred to collectively as loads 460). In some examples, loads 460-1, . . . , 460-4 can include DIMMs, and loads 460-5, . . . , 460-8 can include NVDIMMs. However, examples of the present disclosure are not limited to DIMMs and NVDIMMs, nor are examples of the present disclosure limited to eight loads within system 400.

In response to a power outage, a component of the system can enter a self-refresh mode, powered by the UPS 440. In response to the UPS 440 insufficiently providing backup, and/or in response to UPS 440 being drained of its power, the component can enter a backup power mode where BPS 410 is used to back up the data. BPS 410 can calculate a real-time load consumption to reserve for full back up and can allocate redundant energy as UPS 410 continues acting as self-refresh power.

CBPS 442 can be in communication with a processing unit (e.g., central processing unit (CPU) 444) to communicate with loads 460 and other components of system 400. For example, CBPS 442 can communicate with CPU 444 via communication path 446, which can be in communication with loads 460, video card 454 and controllers 456 and 458 via communication paths 448, 450, and 452. In some examples, controller 456 can be a network interface controller (NIC) and controller 458 can be a smart array controller (SAC). Controllers 456 and 458 can backup data to an external drive in some examples, thus acting as redundancy to UPS 440 and BPS 410. Using communication paths 446, 448, 450, and 452, CBPS 445 can communicate redundancy information to loads 460 and other components of system 400. For instance, which mode (e.g., backup, self-refresh) each component and/or load should enter can be communicated.

UPS 440 and BPS 410 can act as redundancy for one another in case of a single portion failure, in some examples. For instance, if UPS 440 provides insufficient backup, fails, and/or is drained of power, BPS 410 can back up system 400 and its components. Alternatively or additionally, if BPS 410 provides insufficient backup, fails, and/or is drained of power, UPS 440 can back up system 400 and its components.

In some examples, BPS 410 can calculate real-time load consumption of each of the loads 460. In response, BPS 410 can allocate energy of BPS 410 and UPS 440 to each of the loads 460. For instance, BPS 410 can allocate some of its own energy to back up a first portion of loads 460 via a backup mode, while UPS 440 can back up a different portion of loads 460 via a self-refresh mode. This allocation can be performed dynamically, meaning the allocation can be variable and/or constantly changing in response to a particular influence (e.g., changes in load consumption and/or power outages).

In some examples, system 400 can include a consolidated non-volatile (NV) storage device 462. The consolidated NV storage device 462 can reside on a DIMM slot or a system bus (e.g., PCI-Express), among others. In some instances, the consolidated NV storage device 462 can be coupled to loads 460-1, . . . , 460-4 to act as redundancy for loads 460-1, . . . , 460-4 in response to loss of power of the UPS and the BPS. While device 462 may not be present in all examples, in examples of the present disclosure including device 462, device 462 can reduce a risk that some loads (e.g., DIMMs) will have un-flashed data in DRAM lost if both UPS 440 and BPS 410 are completely drained before main power returns to system 400 after an outage, FIG. 5 illustrates an example system flow diagram 530 according to the present disclosure. At 564, a system (e.g., system 100, 200, 300, 400) is not experiencing a power outage (e.g., power is on to the system). At 565, a check is performed, for instance by system firmware and/or by components of a CBPS, whether or not the system is in self-refresh mode. If the system is in self-refresh mode, at 566, the system is instructed to wake up from self-refresh mode.

If the system is not in self-refresh mode, at 571 a check is performed, for instance by system firmware and/or by components of a CBPS, whether or not the system is in backup mode. If it is determined that the system is in backup mode, at 572 a determination is made whether backup of the system is complete. If it is not, the system is allowed to finish backup. If backup is complete, it is determined that the system is in "normal" power on mode, and the system has been recovered, as illustrated at 567. A similar conclusion can be made in response to the system waking up from self-refresh mode at 566, as well as if it is determined that the system is not in backup mode at 571. As used herein, "normal" can refer to the system performing properly (e.g., no system outage) such that self-refresh and/or backup are not needed, Data is not transferred during this "normal" state.

At 568, UPS and BPS portions of a CBPS are allocated. For instance, the BPS portion can calculate load consumption and allocate UPS and BPS portions to particular loads in case of power outages. At 573, a determination is made whether the BPS portion is in working order or "good". For example, it can be determined whether the BPS portion is fully charged. If it is not, checks are made on the BPS portion until it is "good", In response to the BPS portion being in working order, backup mode functionality is enabled at 575.

The UPS portion can be checked at 575 to make sure it is in working order or "good". For instance, it can be determined whether the UPS portion is fully charged. If it is not, checks are made on the BPS portion until it is "good". In response to the UPS portion being in working order, self-refresh mode functionality is enabled at 575.

At 570, a determination can be made whether there has been a power outage of the system. If there has not been a power outage, the system is continuously monitored for an outage. If there has been a power outage, the system can enter self-refresh mode (e.g., via the UPS) at 577. At 578, a determination can be made whether power to the system has returned. If it has not, the system can remain in self-refresh mode. If power has returned a self-refresh mode command can be sent to associated devices/components communicating the same (e.g., via a BPS, UPS, or system firmware).

At 580, self-refresh mode is entered in response to the command, and at 585 a determination is made whether power has returned to the system. If power has returned, the system returns to a power on state at 564. If power has not returned, a determination is made at 584 as to whether the UPS is providing sufficient backup to the system. If it is, a power determination is made again. If the UPS is insufficient, the system enters backup mode at 583 (e.g., via a BPS).

In some examples of the present disclosure, a UPS portion of a CBPS will be used first (e.g., before a BPS). The UPS portion can support self-refresh mode for an extended period of time (e.g., months, years, etc.), while expending less energy than backup mode (e.g., via a BPS). For example, in self-refresh mode data may not be transferred from DRAM to flash/persistent memory, so less power is consumed. In some examples, power may return to a system before the UPS loses power. If the UPS is insufficient or fails, the BPS can be employed as redundancy.

At 582, it is determined whether the backup is finished. If it is not, the system is monitored until the backup is complete. If the backup is finished, a determination is made at 581 whether power has returned to the system. If it has not, the system shuts down at 576. If power has returned, the system returns to a power on state at 564. Examples illustrated in FIG. 5 may be implemented using modules, system firmware, and/or a CBPS, among others.

FIG. 6 illustrates a diagram of an example method 690 according to the present disclosure, At 692, method 690 includes performing backup in self-refresh mode using a UPS in response to a power system outage. At 694, method 690 includes performing backup using a BPS coupled to the UPS in response to the UPS providing insufficient backup to the power system. For instance, self-refresh mode can conserve power, making it a more efficient way to back up a system. However, should the UPS be insufficient, a system can employ the BPS and enter backup mode (e.g., using flash and/or non-volatile storage) to back up the system. In some instances, both self-refresh mode and back up mode can be utilized.

In some examples, method 690 can include receiving a load consumption of each of a plurality of loads on each of the UPS and the BPS, determining a charging priority between the UPS and the BPS based on load consumptions, and implementing the charging priority. For example, the UPS may charge fully before the BPS begins charging or vice versa. This priority can be determined, in some examples, because the UPS and the BPS can share energy and/or charges within a CBPS.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A system comprising:
   a node;
   a combined backup power supply (CBPS) coupled to the node, the CBPS comprising:
      an uninterruptible power supply (UPS); and
      a backup power supply (BPS) coupled to the UPS to:
         calculate a load consumption of each of a plurality of loads; and
         in response to the load consumption, allocate energy of the BPS to a first subset of the plurality of loads, and allocate energy of the UPS to a second subset of the plurality of loads;
   a non-transitory storage medium storing computer executable instructions that are executable to, in response to a power outage:
      determine whether the UPS is providing sufficient backup power to a first load of the plurality of the loads, wherein the first load comprises a memory, and wherein the computer executable instructions are to send a self-refresh command to cause the memory to operate in a self-refresh mode when the memory is powered by the UPS, and
      in response to determining that the UPS is providing insufficient backup power to the first load, cause the first load to switch to being powered by the BPS.

2. The system of claim 1, wherein the UPS is to share a first charge with the BPS, and the BPS is to share a second charge with the UPS.

3. The system of claim 1, wherein the UPS is to act as redundancy for the BPS via a self-refresh mode, and the BPS is to act as redundancy for the UPS via a backup mode.

4. The system of claim 1, comprising system firmware implemented using processor executable instructions to send a self-refresh mode command to the plurality of loads in response to a system power outage.

5. The system of claim 1, comprising a controller to act as redundancy for the BPS and the UPS by backing up data to an external drive.

6. A system comprising:
   a node; and
   a combined backup power supply (CBPS) coupled to the node, the CBPS comprising:
      an uninterruptible power supply (UPS);
      a backup power supply (BPS) coupled to the UPS to act as redundancy for the UPS, the node storing computer executable instructions to:
      determine a current charge levels for the UPS and the BPS;
      allocate a first portion of a plurality of loads supported by the node to the UPS based on the determined current charge level for the UPS, and allocate a second portion of the plurality of loads to the BPS based on the determined current charge level for the BPS;
      in response to a power outage:
         determine whether the UPS is providing sufficient backup power to a first load of the plurality of the loads, wherein the first load comprises a memory, and wherein the computer executable instructions are to send a self-refresh command to cause the memory to operate in a self-refresh mode when the memory is powered by the UPS, and in response to determining that the UPS is providing insufficient backup power to the first load, cause the first load to switch to being powered by the BPS.

7. The system of claim 6, the UPS to act as redundancy for the BPS.

8. The system of claim 6, comprising a consolidated storage coupled to a portion of the plurality of loads to act as redundancy for the portion of the plurality of loads in response to a loss of power of the UPS and the BPS.

9. The system of claim 8, wherein the portion of the plurality of loads includes a dual inline memory module (DIMM).

10. The system of claim 8, wherein the consolidated storage is located on at least one of a DIMM slot and a system bus.

11. The system of claim 6, wherein the plurality of loads includes a DIMM and a Non-Volatile Dual In-Line Memory Module (NVDIMM).

12. The system of claim 1, wherein the computer executable instructions are to, in response to determining that the UPS is providing insufficient backup power to the memory, cause the memory to operate in a backup mode in which the memory is powered by the BPS and data of the memory is moved to a persistent memory.

13. A method comprising:
determining current charge levels for an uninterruptible power supply (UPS) and a backup power supply (BPS);
allocating a first portion of a plurality of loads to the UPS based on the determined current charge level for the UPS;
allocating a second portion of the plurality of loads to the BPS based on the determined current charge level for the BPS;
in response to a power system outage:
performing power backup in self-refresh mode for the first portion of the plurality of loads using the UPS;
determining whether the UPS is providing sufficient backup power to a first load of the plurality of the loads, wherein the first load comprises a memory, and wherein computer executable instructions are to send a self-refresh command to cause the memory to operate in a self-refresh mode when the memory is powered by the UPS; and
in response to determining that the UPS is providing insufficient backup power to the first load, causing the first load to switch to being powered by the BPS.

14. The method of claim 13, comprising:
receiving a load consumption of each of a plurality of loads supported by a node coupled to the BPS and the UPS;
determining a charging priority between the UPS and the BPS based on the load consumptions; and
implementing the charging priority.

15. The method of claim 14, comprising the BPS dynamically allocating energy of the UPS and energy of the BPS to each of the plurality of loads based on the load consumption.

16. The method of claim 13, comprising system firmware implemented using processor executable instructions notifying a plurality of loads supported by a node coupled to the BPS and the UPS of the backup using the BPS.

* * * * *